United States Patent [19]

Westendorf et al.

[11] 4,415,303
[45] Nov. 15, 1983

[54] AUGER WAGON

[75] Inventors: Neal W. Westendorf; Joseph W. Langenfeld, both of Onawa, Iowa

[73] Assignee: Westendorf Manufacturing Company, Onawa, Iowa

[21] Appl. No.: 263,403

[22] Filed: May 14, 1981

[51] Int. Cl.³ .............................................. B60P 1/40
[52] U.S. Cl. ................................. 414/519; 198/536; 414/523; 414/526
[58] Field of Search .............. 198/525, 530, 532, 548, 198/563, 536, 671; 414/519, 523, 526, 305, 310, 311, 326

[56] References Cited

U.S. PATENT DOCUMENTS

| | | | |
|---|---|---|---|
| 1,017,210 | 2/1912 | Grimes | 198/548 X |
| 2,439,541 | 4/1948 | Hall | 414/523 X |
| 3,337,068 | 8/1967 | Meharry | 414/526 X |
| 3,717,272 | 2/1973 | Chartier et al. | 414/526 X |
| 3,726,024 | 4/1973 | Erwin | 414/526 X |

Primary Examiner—Robert G. Sheridan
Attorney, Agent, or Firm—Zarley, McKee, Thomte, Voorhees & Sease

[57] ABSTRACT

An auger wagon of a type used in the transport of grain wherein the wagon has a grain box with inwardly sloping sides supported on a wheel mounted frame. A vertical auger is pivotally mounted at the center of the box floor and may be pivoted into a position for dispensing grain from any side of the grain box. A rotating head chute at the top of the auger allows grain to be directed toward the interior of the box. A grain cover operated by an external handle controls the inflow of grain at the auger base. A sliding door positioned on the lower portion of one of the grain box walls allows the auger wagon to function as a gravity box with or without the auger. The auger wagon functions as a gravity flow box, an auger wagon and a mixer wagon.

9 Claims, 6 Drawing Figures

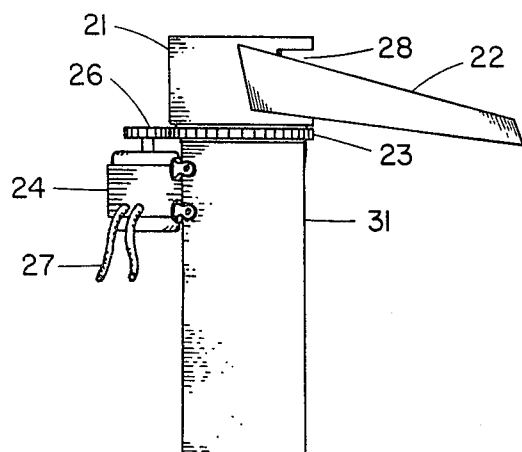
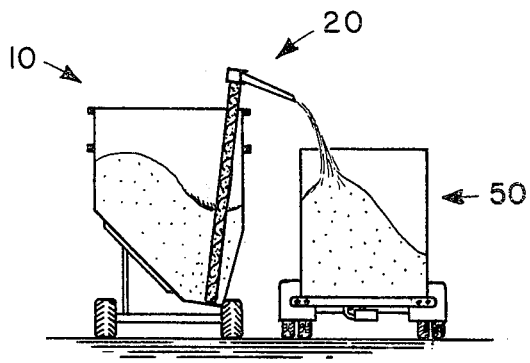
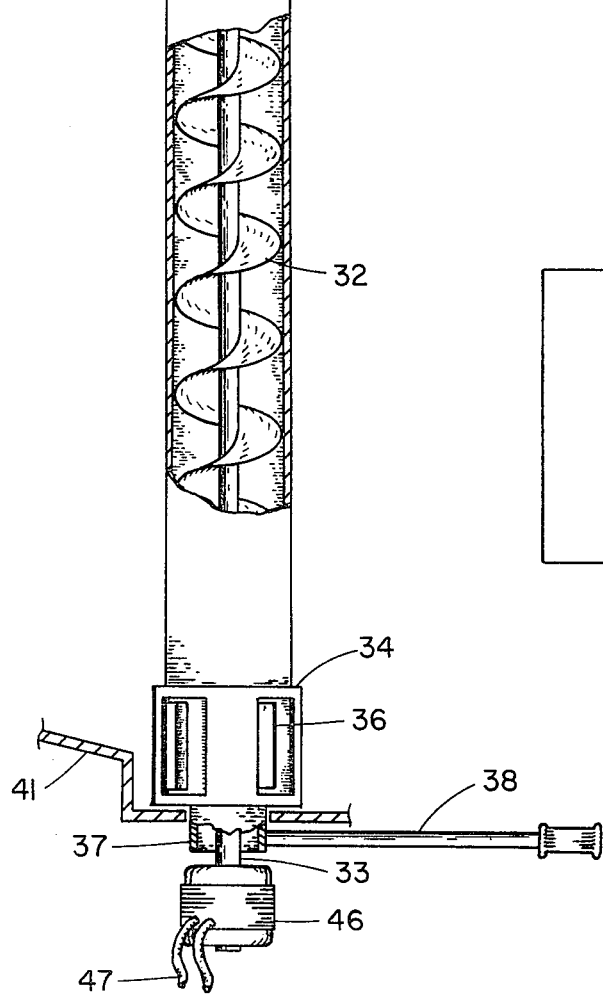
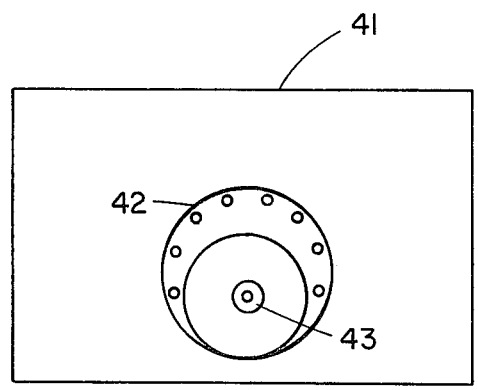
Fig. 6
Fig. 5
Fig. 4

AUGER WAGON

BACKGROUND OF THE INVENTION

Wagons of various types have been used by farmers since the earliest beginnings of agriculture. Modern grain wagons, to which the present invention relates, generally consist of a relatively deep, four-sided container box supported on a wheel mounted frame. A trailer tongue, mounted at the front of the frame, allows the wagon to be pulled by farm tractors, trucks or other towing vehicles. Most grain wagons have relatively deep container boxes to facilitate the carrying of a large volume of grain. However, the depth of a grain box can make unloading of grain by manual methods very strenuous and time consuming. To overcome this drawback, various unloading devices are incorporated with many grain wagons. Some wagons utilize agricultural augers to move the grain out of the box. This is generally accomplished by a horizontal floor auger positioned inside and at the bottom of the box and a vertical auger positioned outside the box along the wall at one end. The horizontal auger moves the grain to the end of the box where the inlet to the vertical auger is located. The vertical auger then raises the grain out of the box onto a waiting truck or other grain receptacle.

Another method for unloading a grain box has been to angle the lower portion of the side walls of the box toward the center of the box. In this arrangement, the walls of the box becomes essentially a sloping floor, which detects all of the grain towards a central point at the bottom of the box. By providing a hopper at the bottom of the box, or a side door in one of the walls near the bottom of the box, the grain may be discharged through the door or hopper opening by use of the force of gravity.

A problem with the double auger arrangement described above is the substantial costs of providing a wagon with two augers and the necessary power sources. Another problem with a double auger grain box is the volume and weight of the augers which limits the amount of grain that can be added to the box. Double auger arrangements also tend to increase maintenance problems since cleaning the box in and around the area occupied by the augers is difficult and time consuming. Yet another problem with the double auger arrangement is that the vertical auguer must necessarily be placed at the end of the box to which the horizontal auger is directed. In many situations, it would be desirable to position the vertical auger at different locations within the box, depending upon the loading requirements for a particular operation. Also, the vertical auger increases the overall length or width of the wagon.

Although a gravity box eliminates some of the problem associated with the use of double augers, it has the great disadvantage of allowing unloading only near the bottom of the box. In many work situations, such as loading grain into a waiting truck, the grain must be elevated above the height of the grain wagon in order to accomplish the job. In this type of application, the gravity box is of little use, and the grain must be transported either manually or with the aid of some external conveyor system.

Thus, it can be seen that a need exists for an agricultural grain wagon which can be unloaded by a device capable of raising the grain to an elevation above the top of the grain box and which is also capable of being positioned to discharge grain from any of the four sides of the grain box. The device should not occupy excessive space within the grain box and should be easily removed to allow cleaning of the grain box. In addition, the grain wagon should be capable of being operated as a gravity box during certain farming applications when elevated loading is not required. And finally, the wagon should allow maximum grain volume, yet not exceed overall safe width for transporting the wagon on the road.

SUMMARY OF THE INVENTION

The present invention discloses a gravity flow grain box with a single, pivoting, vertical auger which overcomes the disadvantages associated with double augers and gravity boxes without augers.

Accordingly, it is the primary object of the present invention to provide a gravity feed grain wagon with a pivoting vertical auger.

It is another object of the invention to provide a grain wagon with a vertical auger having a pivoting head.

It is another object of the invention to provide a gravity flow grain wagon with a removable auger.

It is another object of the invention to provide an auger wagon which may utilize hydraulic or electrical power sources.

It is another object of the invention to provide an auger wagon having an auger with a closeable grain cover.

It is another object of the invention to provide an auger wagon which may use a gravity flow unloading system whether or not the auger is mounted in the grain box.

It is another object of the invention to provide an auger wagon with a single vertical auger which may be positioned at any point along the rim of the grain box.

It is another object of the invention to provide an auger wagon wherein the auger head may be pivoted 360°.

It is another object of the invention to provide an auger wagon which is relatively inexpensive.

It is another object of the invention to provide an auger wagon which is safe to operate.

It is another object of the invention to provide an auger wagon which is cost effective to operate.

It is a further object of the invention to provide a gravity flow box having a means to transfer material to a higher elevation.

It is a further object of the invention to provide a grain wagon combining the advantages of a gravity flow box with the advantages of an auger wagon.

It is a further object of the invention to provide a gravity flow box with a vertical auger having multiple positioning points.

It is a further object of the invention to provide a gravity flow box having a vertical auger inside the box.

It is a still further object of the invention to provide a discharge spout near the top of the auger wherein the spout will fully rotate within 360 degrees and wherein the gravity flow box can be used as an auger wagon as well as a mixer wagon by having the spout discharge the grain back into the wagon.

A yet further object of the invention is to provide an auger having an adjustable inlet to control the speed of discharge of the grain.

A yet further object of the invention is to provide an adjustable inlet on a vertical auger so that the auger may be emptied and wherein material is prevented from being compacted within the auger.

A still yet further object of the invention is to provide an auger adaptable to a gravity flow box which may be attached inside the box so that the total width of the unit remains less then eight feet for transporting on the road.

BRIEF DESCRIPTION OF THE DRAWINGS

FIG. 4 is a detailed elevation view of the auger.

FIG. 5 is a top perspective view of the wagon box floor.

FIG. 6 is a cutaway end view illustrating transfer of grain from the auger wagon to a truck.

DESCRIPTION OF THE PREFERRED EMBODIMENTS

Figure 1:
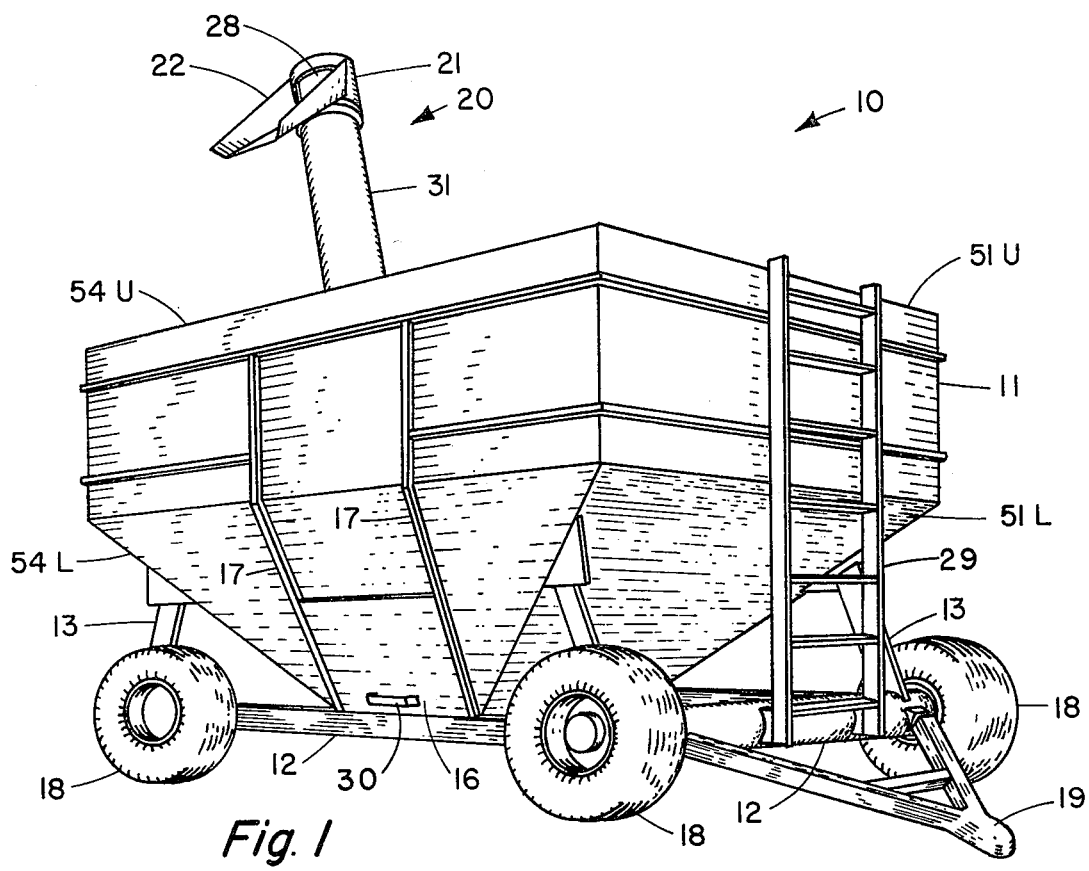
FIG. 1 is a frontal perspective view of the auger wagon.
Figure 2:
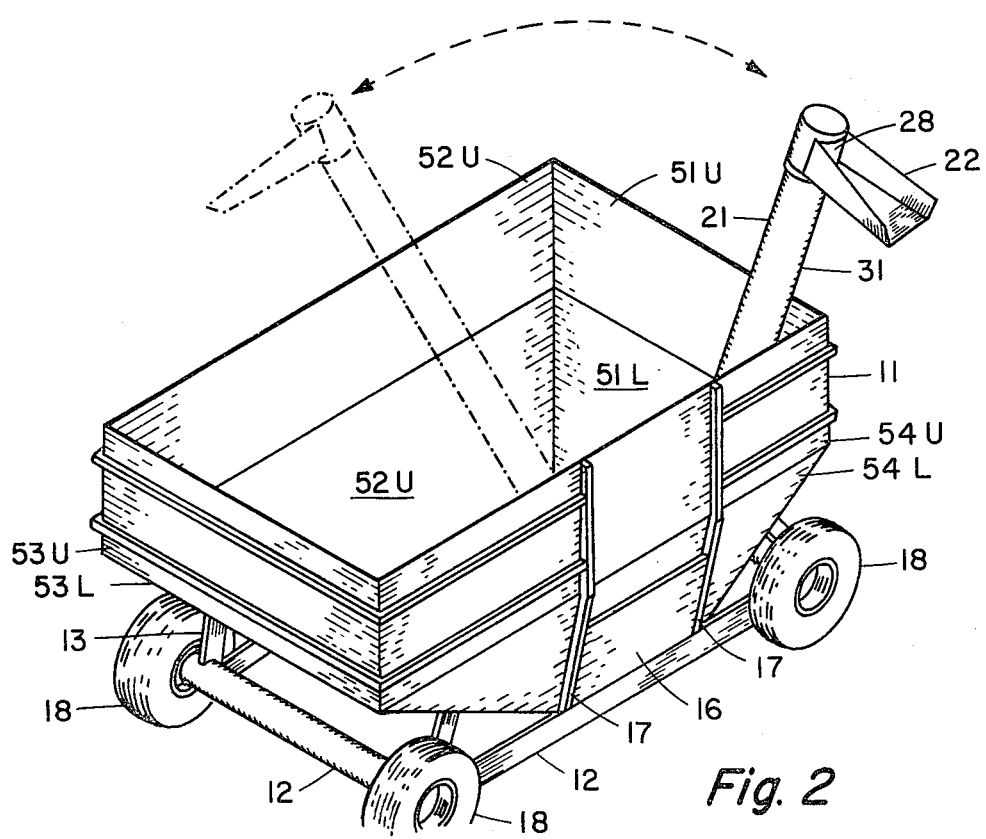
FIG. 2 is a top perspective view of the auger wagon showing the pivoting feature of the auger.

It can be seen from FIG. 1 that the auger wagon 10 of the preferred embodiment consists of a farm wagon having an open box 11 with a vertical auger 20 positioned within the box 11. As shown by FIG. 2, the vertical auger 20 may be pivoted to various positions within the wagon box 11. As shown in FIG. 6, the vertical auger 20 may be used to transport grain from the auger wagon 10 to a truck 50, grain bin (not shown) or other desired location.

Figure 3:
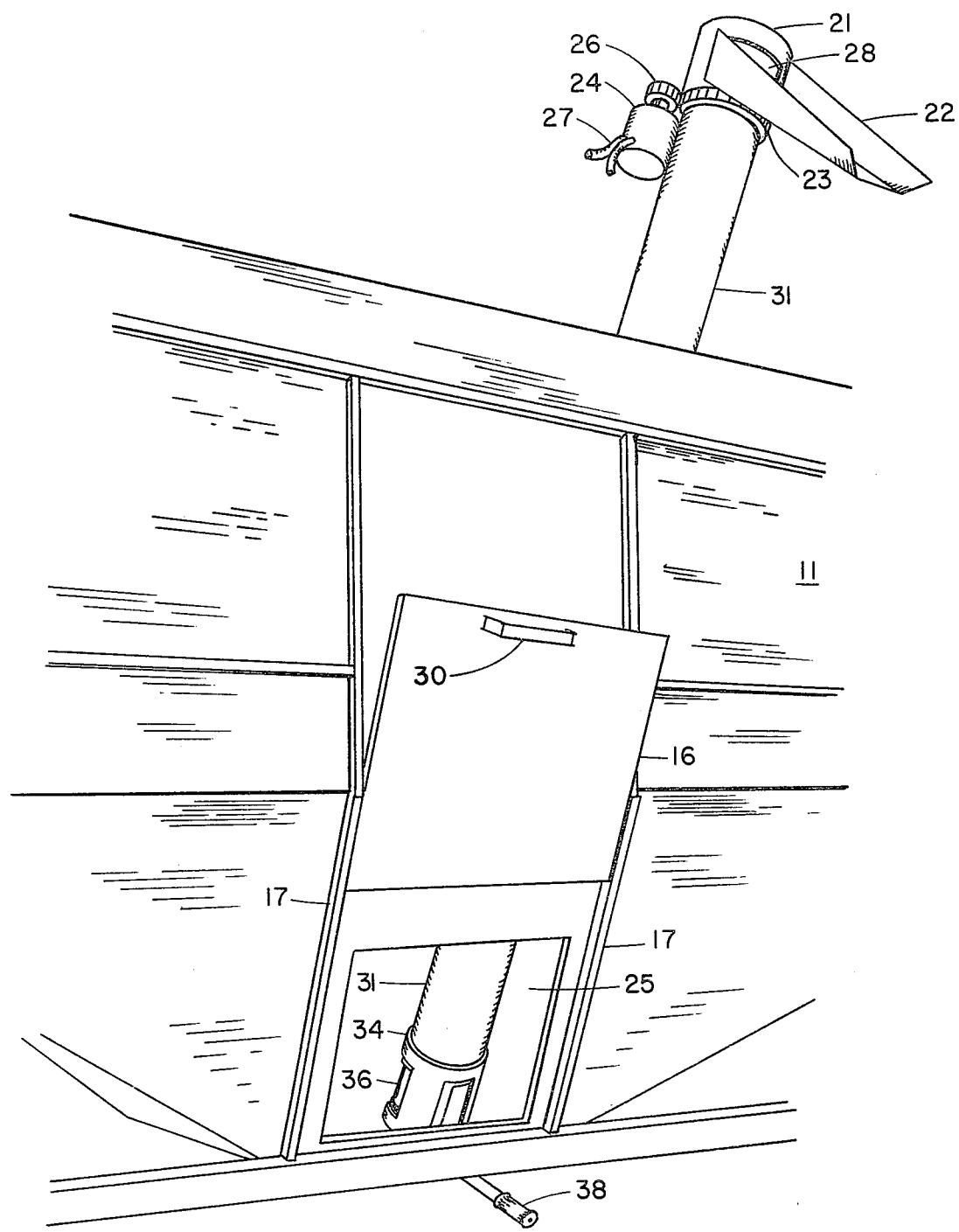
FIG. 3 is a detailed perspective view of the auger and grain box.

The wagon box 11 of the preferred embodiment has four lateral walls 51, 52, 53 and 54. The upper portion of the box 11 is rectangular as viewed from the top, with each wall positioned in a vertical plane. In the drawings, the designation "U" indicates the upper portion of a lateral wall and the designation "L" indicates the lower portion of the lateral wall. At a distance of two or three feet from the top of the box 11, the lateral walls 51-54 are sloped inward towards a rectangular box floor bottom 41 as shown in FIG. 5. The lower portion of the walls 51L and 53L positioned at the front and rear of the wagon 10 slope inward at the same angle of indication. The lower wall portions 52L and 54L positioned at the left and right sides of the wagon also slope inward but at different angles of inclination. One of the side walls 54L slopes only slightly inward from a vertical plane, while the opposite side wall 52L slopes inward at approximately the same angle as the end walls 51L and 53L. Although other materials may be used, the walls 51-54 of the box 11 in the preferred embodiment are metal plates which have been welded together at the seams. A sliding door 16 mounted on runners 17 is positioned at the lower side wall 54L having the greater vertical alignment. The door 16 may be raised on its runners 17 to expose a box door opening 25 in the wall 54L as shown in FIG. 3. The door may be raised by means of a handle 30, or by means of a chain and sprocket mechanism (not shown), or by other door mechanisms of various types well known in the art. The grain box floor bottom 41 is substantially horizontal with a slight inclination towards the side wall 54 containing the door 16, as illustrated in FIG. 4. The inward slope of the walls 51-54L and the inclination of the floor 41 cause any material which is stored in the box 11 to be funneled in the direction of the door 16, thus allowing the box to be substantially emptied by the force of gravity whenever the door 16 is opened.

The wagon box 11 is mounted on a rectangular frame 12 by means of frame attachment members 13 which are welded to the exterior corners of the box 11 and the frame 12, as shown in FIGS. 1 and 2. The frame 12 is mounted on conventional wheels 18 as shown in FIGS. 1 and 2. A wagon tongue 19 is mounted on a pivoting front wheel frame member 14 which allows the wagon to be steered and pulled behind a farm tractor or other vehicle. A ladder 29 mounted on one or more of the exterior walls 51-54 of the auger wagon 10 as shown in FIG. 1 allows the farmer to check the height of the material stored within the wagon or to reposition the vertical auger 20 within the wagon.

As shown in FIG. 4, the vertical auger 20 is positioned within an auger well 42 located in the box floor bottom 41. The vertical auger 20 has an auger screw 32 of a type well known in the art positioned within a cylindrical, open ended, auger housing 31. An auger head 21 consisting of a hollow cylinder with one closed end and an opening in the cylinder wall is rotatively positioned at the top of the auger housing 31. An auger head sprocket gear 23 which is attached to the lateral periphery of the auger head 21 at its lower edge is in geared attachment to a head motor gear 26. The head motor gear 26 is in turn operably mounted on a head motor 24 which is attached to the exterior surface of the auger housing 31 by brackets or other conventional attachment means. The head motor may be either hydraulic or electrical and is powered by energy supply lines 27. The auger head 21 may be rotated 360° by operation of the auger head motor 24. An auger chute 22 mounted on the auger head at the opening 28 allows grain which is being transported by the auger screw 32 to be projected out a few feet from the opening in the auger head 21 before being dumped. The auger chute 22 has a trough like shape and is connected to the auger head 21 by means of welding, brackets, or other conventional attachment means well known in the art. It can be seen from FIGS. 3 and 4 that an auger screw shaft 33 projecting from the lower end of the auger screw 32 extends beyond the lower end of the auger housing 31 through a hole 43 in the box floor bottom 41. The lower end of the auger screw shaft 33 is connected to an auger shaft motor 46 by conventional means well known in the art. The auger shaft motor may be either hydraulic or electrical and is energized by means of shaft motor energy lines 47. An auger grain cover 34 is rotatably mounted on the lower end of the auger housing 31, as shown in FIG. 4. The auger grain cover 34 consists of a hollow cylinder with one closed end and elongated rectangular openings positioned uniformly around the cylindrical wall. The openings in the auger grain cover 34 are associated with similarly shaped housing openings 36 positioned in the auger housing 31 in the area covered by the auger cover 34. The auger cover 34 is positioned in sliding frictional contact with the vertical auger well 42 in the box floor bottom 41. A hole in the center of the circular end of the auger cover 34 is adapted to accept the auger screw shaft 33. A grain cover sleeve 37 projects downward in radial alignment with the screw shaft 33 through the pivot well hole 43 to a distance of 3 or 4 inches below the box floor bottom 41. A grain cover handle 38, attached to the sleeve 37 by conventional means, has an elongated handle portion which extends out beyond the wagon bottom as shown in FIG. 3. By manual operation of the grain cover handle 38, the grain cover 34 may be rotated with respect to the grain cover housing 31 thereby allowing the housing openings 36 to be opened or closed.

Grain cover handle 38 allows an outside the box means to close an inside the box auger cover 34.

The auger grain cover 34 allows an operator to prevent grain from entering the vertical auger thereby allowing the auger to be cleared of grain prior to turning the auger off. Without this feature, the auger would be difficult to start since the resistance caused by grain remaining within the auger housing 31 causes a much larger start up load than an empty auger and requires more operating power than an auger which is actively moving grain.

As shown by FIGS. 2 and 4, the vertical auger 20 may be pivoted within the auger well 42, thus allowing the upper end of the auger 20 to be positioned at any desired point around the upper edge of the wagon box 11. Once the vertical auger 20 has been placed in the desired position, it may be maintained in that position either through the weight and packing effect of the grain which is loaded into the box 11, or it may be fastened into position by means of brackets, collars, or other attachment means (not shown) of a type well known in the mechanical arts. Once positioned, the auger head 21 may be revolved into the desired loading direction by means of the head motor 24. The rotatable feature of the auger head 21 allows it to be repositioned toward the interior of the box 11, thereby allowing the width of the auger wagon 10 to be maintained within legal guidelines during road travel. The rotatable feature also allows the grain to be directed back into wagon box 11 if it is desired that the grain be mixed. Thus, the invention has the features of a mixer wagon, an auger wagon and a gravity flow box.

The shape of the box 11 allows a single vertical auger 20 to be used in place of a more expensive floor auger/vertical auger arrangement used in conventional auger wagons. If desired, the vertical auger 20 can be removed from the box 11 by a very simple disconnection procedure and the auger wagon 10 can be converted into a conventional grain holder with a gravity box. A further advantage of the present invention is that the gravity flow feature of the box 11 is compatable with the vertical auger. Grain may be removed from the wagon 10 through the door even when the vertical auger 20 is in the box 11. Thus, even if the vertical auger 20 were to malfunction, the wagon 10 could be unloaded without the need for manually shoveling the grain out of the box 11.

The auger wagon 10 as described above has many applications involving the storage and transportation of any material which lends itself to conveyance by an auger and such applications are within the scope of the present invention. Although specific components, proportions and process steps have been stated in the above description of the preferred embodiments of the invention, other suitable materials, proportions and process steps, may be used with satisfactory results in varying degrees of quality. In addition, it will be understood that various other changes of the details, materials, steps, arrangements of parts, and uses which have been herein described and illustrated in order to explain the nature of the invention will occur to and may be made by those skilled in the art, upon a reading of this disclosure, and such changes are intended to be included within the principles and scope of this invention.

We claim:

1. An auger wagon comprising:
    a wheel mounted frame,
    a container box operably mounted on said frame wherein said container box comprises an open top, inwardly sloping lateral walls, and a box floor attached at its periphery to said lateral walls, and
    a single auger means mounted on the floor of said container box for transporting particulate matter,
    said auger means comprising an auger housing and an auger screw operably mounted within said auger housing,
    said auger means comprising a top end and a bottom end and wherein said bottom end of said auger means is pivotally connected to said box floor, the distance between the top and bottom of said auger means being greater than the distance between said point of pivotal attachment and any point on the walls of said box,
    said auger floor comprising an auger well positioned at the point of auger means attachment adapted to allow inclination of said auger means against the walls of said box,
    said auger means comprising an auger head, for directing the outflow of particulate material, pivotally mounted at the top of said auger means wherein the pivot axis of said auger head is coaxial with the longitudinal axis of said auger screw,
    said auger means comprising an auger housing openings positioned in said housing near the bottom of said auger means for allowing the inflow of particulate matter into said auger means, said auger means comprising an auger cover positioned at the bottom of said auger means in enclosing relationship with said housing openings for selectively covering and uncovering said housing openings,
    said auger means comprising a first motor means operably attached to said auger screw for turning said auger screw,
    said auger means comprising a second motor means operably attached to said auger head for selectively rotating said auger head,
    said auger means comprising an elongate cover handle operably attached to said auger cover and mounted on the bottom exterior surface of said box floor for selectively rotating said auger cover with respect to said housing openings.

2. The auger wagon of claim 1 further comprising a box door positioned proximate the bottom of said box.

3. The auger wagon of claim 2 wherein said box door comprises a sliding door positioned on the lower portion of a lateral wall of said box.

4. The auger wagon of claim 3 wherein said auger floor is inclined toward said sliding door.

5. The auger wagon of claim 4 further comprising attachment means mounted on the walls of said auger wagon for selectively securing said auger means at a desired position along said lateral walls.

6. The auger wagon of claim 5 wherein said auger head may be rotated 360°.

7. The auger wagon of claim 6 wherein the floor of said auger wagon has a surface area smaller than 10% of the surface area of the opening at the top of said grain box.

8. The auger wagon of claim 7 wherein said wheel mounted frame comprises trailer tongue means for towing said auger wagon.

9. An auger wagon comprising,
    a wheel mounted frame, a container box operably mounted on said frame wherein said container box comprises an open top, inwardly sloping lateral walls, and a box floor attached at its periphery to said lateral walls, and a single auger means mounted on the floor of said container box for transporting particulate matter, said auger means being positioned within said container box and having its lower end selectively pivotally mounted on said floor whereby said auger means may be selectively moved adjacent any of said lateral walls, said auger means comprising auger housing openings positioned in said housing near the bottom of said auger means for allowing the inflow of particulate matter into said auger means, and wherein said auger means comprises an auger cover positioned at the bottom of said auger means in enclosing relationship with said housing openings, said auger means also including an elongate cover handle operably attached to said auger cover and mounted on the bottom exterior surface of said box floor for selectively rotating said auger cover with respect to said housing openings.

* * * * *